3,231,516
CATALYST CONTAINING ACTIVATED BAUXITE
Wright W. Gary, Beverly Hills, Calif., assignor to Minerals
 & Chemicals Philipp Corporation, Menlo Park, N.J., a
 corporation of Maryland
No Drawing. Filed July 12, 1962, Ser. No. 209,314
6 Claims. (Cl. 252—437)

This invention relates, generally, to catalysts containing activated bauxite and relates, especially, to oxidation catalysts containing activated bauxite as the support material and to the use of such catalysts in the purification of exhaust vapors containing unburned fuel hydrocarbons.

In recent years the correlation between the presence of unburned fuel hydrocarbons in the atmosphere and the production of so-called "smog" conditions has been established with some certainty. Smog irritants, which are deleterious to health and comfort, are believed to be the result of a gaseous phase photochemical reaction in which unburned fuel hydrocarbons and nitrogen oxides in the atmosphere are prime contributory factors. The fuel hydrocarbons enter the atmosphere from the exhaust of internal combustion engines and the effluent of smokestacks along with carbon monoxide. Many efforts have been made in the past to eliminate noxious matter normally present in exhaust fumes, particulaly exhaust from internal combustion engines. The most promising approach has involved the inclusion in a modified acoustic muffler of a zone (or a plurality of zones) of exhaust-treating material so that raw exhaust comes in direct contact with and is purified by active exhaust-treating material before the exhaust passes into the atmosphere.

The problem of purifying exhaust with any material, particularly exhaust from an automobile or the like, is a very difficult and complex matter. The exhaust-treating muffler-type device is subjected in use to wide fluctuations in temperature over short periods of time. As a result, the exhaust-treating substance is prone to failure due to thermal stress. Frequently engine exhaust reaches temperatures as high as 1500° F. or higher. At temperatures of this order, many materials tend to lose permanently their catalytic activity. Catalysts which promote oxidation of carbon monoxide in addition to the oxidation of fuel hydrocarbons are particularly liable to encounter extremely elevated temperature as a result of the great exotherm involved in the oxidation of carbon monoxide. Moreover, the movement of the vehicle itself subjects the materials in the exhaust purification system to attritive forces. Unless the active exhaust purifying material is highly resistant to attrition and thermal stress, it disintegrates into fines which tend to plug up and channel the flow of exhaust gases through the purifier. If the fines are sufficiently small, they are carried out of the purifier with the effluent exhaust and represent an economic loss. In any event, physical breakdown of an exhaust-treating solid results in reduced efficiency of the solid, either by preventing uniform solid-vapor contact or by reducing the content of active solids present in the exhaust-treating device.

Many forms of catalyst solids have been advocated for purifying exhaust vapors. The use of an exhaust-treating solid in granular or pelleted form appears to be more promising than the use of structural catalytic elements since granular or pelleted particles are less costly to manufacture than rigid structural catalytic elements and are easier to introduce into and withdraw from the exhaust-purifying device. Normally such granules are maintained in a housing which doubles as an acoustic muffler, as mentioned above.

A serious problem is encountered, however, in purifying exhaust gases of internal combustion engines using granular material. As a result of vibration, the granules roll over each other and attrite. Moreover, due to successive thermal expansion and contraction, many granular compositions suggested for treating engine exhaust have a strong tendency to break down, with the adverse effects above-noted.

It has been suggested to purify exhaust of internal combustion engines with a synthetic alumina-supported platinum oxidation catalyst. One disadvantage is the high cost of the catalyst. Another difficulty is that the catalyst is not thermally stable at the elevated temperatures (e.g., a temperature of 1500° F. or higher) which engine exhaust may reach so that the catalyst becomes sintered and diminishes in catalytic activity. In addition to the above-menitoned difficulties, the platinum catalyst is very susceptible to "poisoning" by certain compounds which deposit on and impair the catalytic activity of the precious metal. One such "poison" is lead. When a catalytic exhaust purifier containing the platinum catalyst is used to treat exhaust of an engine operated on leaded fuel, the lead compounds tend to deposit and accumulate on the catalyst bed and impair the activity of the platinum catalyst. Other catalysts which have been reported to be more resistant to lead poisoning than the platinum catalyst leave much to be desired in the way of attrition resistance.

Accordingly, an object of this invention is the provision of exceptionally hard active catalyst particles which maintain their hardness and activity when subjected to attrition and high temperature.

A more specific object is the provision of alumina supported oxidation catalyst particles which retain substantially their catalytic activity and physical form even at high temperatures which exhaust gases from internal combustion engines occasionally attain and which are highly resistant to physical breakdown by attrition.

Another important object of this invention is to provide an effective method for oxidizing fuel hydrocarbons and carbon monoxide in exhaust fumes.

Yet another object is the provision of a method for oxidizing exhaust fumes from an internal combustion engine which is effective even when the exhaust contains lead compounds.

Further objects and advantages of this invention will be readily apparent from the description thereof which follows.

Briefly stated, in accordance with this invention, highly attrition resistant thermally stable supported catalysts, especially supported metal oxide catalyst adapted for the oxidation of carbon monoxide and unburned fuel hydrocarbons in the exhaust of internal combustion engines, are obtained by impregnation of a catalytically active material on a particular type of activated alumina agglomerates, namely, alumina agglomerates that are composed of activated bauxite fines which are cemented together by the combination of alumina and aluminum phosphate, each of which has been formed by reaction in situ of a portion of the aluminum in the bauxite fines with the combination of phosphoric acid and sulfuric acid followed by thermal elimination of sulfate from the acid-reacted bauxite fines. The agglomerates (on which the metal salts are impregnated to produce the catalyst) are formed by mixing bauxite fines (which should be substantially all minus 60 mesh) with a solution of a mixture of sulfuric acid and phosphoric acid in amount sufficient to permit agglomeration of the mixture, forming agglomerates from the mixture, aging the agglomerates at a temperature and for a time sufficient to complete reaction between the bauxite fines and the acids, and without washing the agglomerates, calcining them at a temperature and for a time sufficient to eliminate sulfate therefrom. In producing the improved oxidation catalysts of this invention, a solution of a thermally decomposable salt of a metal oxide oxidation catalyst, especially a copper salt, such as the nitrate, sulfate or acetate, is impregnated on the previously formed activated bauxite agglomerates and the impregnated agglomerates are calcined to decompose the metallic salt, leaving a metal oxide residue on the agglomerates.

The supported catalyst particles of this invention are appreciably harder than catalysts supported on activated bauxite granules that have been obtained by crushing and calcining whole bauxite ore. Catalysts of this invention are also harder than catalysts supported on activated alumina obtained by binding bauxite fines with various other agents, such as alkalies, or sulfuric acid or phosphoric acid, each employed singly. Moreover, catalysts of this invention retain substantially their initial hardness without substantial loss of catalytic activity after they have been subjected to elevated temperatures which would cause other alumina supported catalysts to spall or disintegrate. A road test carried out with a copper oxide supported catalyst of this invention has shown that, even after 12,000 miles service, the catalyst was still highly effective in oxidizing fuel hydrocarbons and carbon monoxide in the exhaust of an automobile. Such result could not be obtained with copper oxide catalysts made up with other alumina support materials.

The bauxite fines employed in producing the support for the catalyst of this invention are obtained from the gibbsitic variety of bauxite (alpha-alumina trihydrate). These fines, which may be obtained as a by-product in the crushing and screening of bauxite ore to produce granular grades of the ore, or which may be produced by intentionally crushing the ore or granular grades of the ore to minus 60 mesh, are preferably activated by calcination before being used in the process. In binding the fines with a mixed solution of sulfuric acid and phosphoric acid, it is preferable to use an excess of sulfuric acid over phosphoric acid, e.g., from 2 to 10 parts by weight of 100% $H_2SO_4$ to 1 part by weight of 100% $H_3PO_4$. The mixed sulfuric acid-phosphoric acid solution should have a total acid concentration within the range of about 50% to 100%. Optimum acid concentration will vary with the agglomeration technique employed. Concentrated acid solutions, e.g., solutions of total acid concentration of 85% and above, are preferred when pelleted agglomerates are formed by extrusion. Total acid dosage will generally be within the range of about 50 to 100 parts by weight of 100% acid to 100 parts by weight of volatile free (V.F.) bauxite, and will vary with the concentration of the mixed acid solution. Normally, the mixed acid solution is employed in an amount within the range of 1 cubic centimeter of mixed acid solution to about 2.0 to 2.5 grams of V.F. bauxite fines.

The mixing of bauxite fines and mixed acid solution to form a uniform mass of a consistency amenable to agglomeration can be carried out in any type of apparatus available for this sort of operation, as for example, a pug mill, a kneader, an inclined disc granulator or a muller mixer. Agglomerates can be spheres, briquets, pills, extruded pellets, etc. They can be made in the shape and size desired for the use in which they are to be employed or they can be made in any shape and size and eventually crushed to granular grade sizes. After their formation, the green agglomerates are aged to complete reaction between the acids and the aluminum in the bauxite. To accelerate reaction, the agglomerates are heated at an oven temperature of about 200° F. to about 400° F. Particle temperature rises to 400° F. or above after reaction is initiated. Aging may be carried out in the presence of air although the agglomerates can also be aged in direct contact with an inert oil, such as mineral oil. Aging time, which will vary considerably with the temperature employed in the aging operation and with the efficiency of heat transfer in the aging equipment, will usually be from ½ hour up to 24 hours.

Calcination of the aged particles (to activate the alumina and to eliminate the sulfate) can be carried out at temperatures within the range of about 900° F. to about 1800° F., depending upon the atmosphere in which calcination is conducted. When calcination is carried out in a reducing atmosphere (i.e., in the presence of CO and $H_2$ obtained, for example, by burning fuel with a deficiency of oxygen), complete desulfation of the aluminum sulfate reaction product can be realized at a temperature appreciably lower than the normal decomposition temperature of aluminum sulfate (1432° F.). At calcination temperatures appreciably lower than 1100° F., the desulfation may be incomplete even when a reducing atmosphere is employed. At calcination temperatures in excess of about 1800° F., undesirable phase changes and loss of surface area of the alumina catalyst support material may occur. Calcination removes combined water from the bauxite, thereby activating the bauxite, and also results in the elimination of sulfur-containing gases which are volatilized and removed from the bauxite agglomerates. The volatile matter (V.M.) of the calcined agglomerates should normally be within the limits of about 1% to 12%.

The agglomerates are then impregnated with the precursor of a catalytic material by techniques that are known to those skilled in the art. Typically, sufficient metal salt impregnant is used to deposit about 10% by weight of catalyst (calculated as metal oxide, such as CuO) on the support, although smaller or larger quantities of impregnant may be preferred for some uses of the catalyst. The properties of the finished catalyst appear to be substantially independent of the thermally decomposable anion of the metal salt employed in the impregnation. This is not true of catalysts obtained by impregnating thermally decomposable metal salts on nonactive forms of alumina.

Metal oxide oxidation catalysts of this invention are useful in promoting various oxidation reactions and, as mentioned, are of especial value in the purification of the exhaust from internal combustion engines. The catalysts obtained by impregnating the mixed acid bonded active alumina agglomerates with thermally decomposable copper salts, followed by thermal decomposition of the metal salt, give especially good results in the purification of engine exhaust and have been found to be eminently effective in oxidizing both carbon monoxide and fuel hydrocarbons in the exhaust. However, it is also within the scope of this invention to produce other metal oxide or mixed metal oxide supported catalysts by impregnating the mixed acid bonded active alumina agglomerates with thermally decomposable salts of zirconium, titanium, chromium, vanadium, molybdenum and potassium. Cupric or cuprous chromite solutions can also be used.

Visual and X-ray diffraction studies indicate that the catalyst obtained, in accordance with this invention, by impregnating a thermally decomposable copper salt on the activated alumina agglomerates and calcining the impregnated agglomerates, is a copper aluminate. This suggests that the active catalytic ingredient is a reaction product of copper in the impregnating solution and the activated alumina support. Inasmuch as the copper is in a copper aluminate is in an oxidized state and CuO is a component of the catalyst, such catalyst will be referred to as a "CuO supported catalyst." The composition of the form or forms of alumina, also present in the catalyst, has not been established with certainty since the catalyst does not diffract X-radiation. Present experience indicates that the gamma form of alumina is present in the catalyst.

In use, impure raw (unoxidized) gases, such as gases from an engine manifold, gases directly from the cylinder of a diesel engine, or smokestack gases, are diluted with air in amount such as to provide oxygen in at least quantity sufficient to oxidize completely oxidizable matter in the impure gas to be treated. Preferably an excess of oxygen is used. The air diluted mixture, usually at a temperature within the range of about 300° F. to 1300° F., is passed into direct contact with catalyst particles of this invention, the particles being housed, for example, in a cartridge mounted in a shell. The gases, after contact with the catalyst, may then be discharged into the atmosphere.

Following is an example of the preparation of supported metal oxide catalyst pellets of this invention and their use in the oxidation of unburned fuel hydrocarbons and carbon monoxide in engine exhaut. The use of CuO as the catalytically active metal oxide is merely illustrative of one type of supported oxidation catalyst and a variety of other catalytically active metal oxides can be employed within the scope of this invention.

In the example, particle hardness was measured by the "4-ball" hardness test, a test widely employed in evaluating the resistance of catalyst particles to physical disintegration when subjected to the action of very strong attritive forces. In carrying out the 4-ball hardness tests, screened test sample was poured into a tared 100 cc. gradulate cylinder to the 80 cc. mark, with gentle tapping to pack the particles. 80 cc. of sample was placed in a stainless steel cylindrical container with four polished stainless steel ball bearings, each of $15/16''$ diameter. The container was closed tightly and it was then rotated about its longitudinal axis on a roller arrangement at about 80 r.p.m. for one hour. After rotation had ceased, the particles in the container were screened on a limiting sieve (10 mesh) and the hardness calculated as the percentage of total sample weight represented by the fraction of the material retained on the limiting sieve.

Catalytic evaluations were made in a "Micro-Reactor," a Pyrex tube (1.1 cm. in diameter and 20 cm. long) in a tube furnace. A 50 ml. sample of 14/28 mesh catalyst was placed in the Pyrex tube, secured in place with glass wool, then heated to the required temperature in an oxygen atmosphere. When the required temperature in the catalyst bed was attained, a 3.13 mg. portion of n-pentane was introduced into the catalyst. The quantity of carbon dioxide and n-pentane in the products was determined by gas-liquid chromatography. The chromatographic unit contained a 2 m. column of 28% by weight silicone oil (D.C.) on 30/60 mesh firebrick. The unit was operated at 50° C. and with a flow rate of 80 cc./min. of oxygen.

V.M. below 1%. The calcined bauxite fines were thoroughly mixed with a 2/1 mixture of $H_2SO_4$ and $H_3PO_4$ of 98.6% total acid concentration (58.6 parts by weight $H_2SO_4$, 28.0 parts $H_3PO_4$ per 100 parts by weight of V.F. bauxite). In mixing the calcined fines with the mixture of acids, the fines were initially slowly added to an acid mixture that had previously been cooled below 80° F. until the slurry was still flowable. About ⅓ of the total bauxite charged was used. During the bauxite addition the slurry was agitated with a mechanical stirrer and maintained at a temperature below 100° F. After further cooling to 80° F., the bauxite-acid slurry was transferred to a pug mill. Additional ore was charged to the slurry in the pug mill until an extrudable mix was obtained. The total residence time of the charge in the pug mill varied from 2 to 4 minutes. The pugged bauxite fines were extruded in a screw-type extruder through a multi-orificed plate to produce rods (0.128" diameter) which were cut into pellets about ⅜" long as they issued from the die plate. The minus 4 mesh extruded pellets were placed in an oven for 1½ to 4 hours at an oven temperature of 250° F. to 300° F. During this period, the bauxite reacted with the acids in the pellets and pellet temperature increased to 400° F. to 430° F. The aged pellets were then desulfate by maintaining them in a muffle furnace (1530° F.) for at least 6 hours until sulfate free. Pellet V.M. was within the range of 3% to 4%.

Supported catalyst pellets analyzing about 10% CuO by weight were made up by impregnation of the calcined pellets with an aqueous copper nitrate solution, followed by drying and then calcination of the impregnated pellets in a muffle furnace at a bed temperature of 900° F. for 1 hour. The pellets were amorphous when investigated by a standard X-ray diffraction procedure.

To evaluate the usefulness of the pellets as an oxidation catalyst, especially the usefulness of the pellets to purify engine exhaust, the hardness, surface area (B.E.T. values obtained with nitrogen) and catalytic activity of the freshly prepared pellets were measured. These properties were then compared with the properties of the catalyst pellets after they had been subjected to either a laboratory heat treatment, to determine their heat stability, or to a road test in a muffler of an automobile operated on leaded gasoline. The results are summarized below in table form.

*Properties of alumina supported CuO oxidation catalyst of this invention*

| Treatment | Hardness, percent +10 mesh | Surface area, m.²/g. | PbO, percent | Catalytic activity | |
|---|---|---|---|---|---|
| | | | | Percent $CO_2$ formed | Percent n-pentane removed |
| None (freshly prepared catalyst) | 95.8 | 56.0 | | 62.2 | 89.2 |
| Heat treatments: | | | | | |
| 1,400° F./66 hrs. | 93.6 | 52.7 | | 38.6 | 61.1 |
| 1,400° F./140 hrs. | | | | 38.1 | 55.6 |
| 1,652° F./5 hrs. | 95.0 | 35.3 | | 38.7 | 64.8 |
| Road test: | | | | | |
| After 4,100 miles | 93.4 | 45.7 | 3.2 | 38.3 | 45.9 |
| After 5,100 miles | | 43.0 | 5.5 | 33.8 | 51.9 |

CALCULATIONS $$\frac{\text{Peak area of n-pentane in products}}{3.17 \text{ sq. in. (peak area for 3.13 mg. of n-pentane)}} \times 100 = \text{Percent n-pentane in products}$$

$$\frac{\text{Peak area of } CO_2 \text{ in products}}{12.75 \text{ sq. in. (peak area for complete oxidation of 3.13 mg. n-pentane to } CO_2)} \times 100 = \text{Percent } CO_2 \text{ in products}$$

In producing the activated alumina support material, minus 60 mesh Demerara bauxite ore was calcined in a muffle furnace at a bed temperature of 1400° F. to a Hardness data in the table show that the impregnated oxidation catalyst of this invention was almost as hard after either extensive heat treatment or prolonged road service as the freshly prepared catalyst. Surface area data show that the catalyst underwent a small reduction in surface area during the heat treatment and the road test, indicating that only a small amount of particle sintering occurred. Catalytic activity data show that after 5,000 miles use in the road test the catalyst still retained more than 50% of its capacity to oxidize carbon monoxide and fuel hydrocarbons in exhaust in spite of considerable accumulation of lead "poison" on the catalyst. The data show also that the catalysts were still active after heat treatments at elevated temperatures.

After being used over 12,000 miles in the road test, the catalyst was sampled and found to be of acceptable hardness and to pass the California specification that the catalyst be capable of producing an effluent exhaust containing less than 275 p.p.m. carbon (as n-hexane) and less than 1½% carbon monoxide by a dynamometer test.

In contrast with the supported CuO catalyst of this invention, which had a 4-ball hardness value of 95.8% after preparation, the 10% CuO catalyst made by copper salt impregnation of the hardest bauxite pellets that could be obtained by binding bauxite fines with a single mineral acid had an initial 4-ball hardness of only 48%. (The latter pellets had been obtained by pugging bauxite fines with a 6.2% dosage of $H_2SO_4$ of 25% concentration, followed by extrusion and complete desulfation of the extruded pellets at 1530° F. The resulting activated alumina support pellets were impregnated with $Cu(NO_3)_2$ solution and calcined at 900° F., as described above.) In further contrast with the CuO catalyst pellets of this invention which had good physical stability when subjected to temperatures as high as 1652° F. for 5 hours, the CuO catalyst made with the activated alumina support obtained by binding the bauxite with $H_2SO_4$ alone had a 4-ball hardness value of only 10% after being heated at 1500° F. for 5 hours.

All mesh sizes mentioned herein refer to values obtained with Tyler screen-scale sieves. The term "volatile matter" refers to the weight percentage of a material that is eliminated when the material is heated to constant weight at 1800° F.

I claim:
1. A catalyst comprising a catalytically active material supported on activated bauxite agglomerates,
    said agglomerates consisting essentially of activated bauxite fines surface cemented together by the combination of alumina and aluminum phosphate each of which has been formed by reaction in situ of a portion of the aluminum of said bauxite fines with a mixture of phosphoric acid and sulfuric acid followed by complete thermal elimination of sulfate therefrom.
2. The catalyst of claim 1 wherein said catalytically active material is a metal oxide oxidation catalyst.
3. The catalyst of claim 2 wherein said metal oxide is copper oxide.
4. Hard, thermally stable catalyst particles adapted for the oxidation of fuel hydrocarbons and carbon monoxide in the exhaust from an internal combustion engine comprising the reaction product obtained by impregnating a solution of a thermally decomposable salt of copper on particles of activated bauxite agglomerates and then heating the agglomerates at a temperature and for a time sufficient to decompose completely said salt,
    said activated bauxite agglomerates consisting essentially of activated bauxite fines surface cemented together by the combination of alumina and aluminum phosphate each of which has been formed by reaction in situ of a portion of the aluminum of said bauxite fines with a mixture of phosphoric acid and sulfuric acid followed by complete thermal elimination of sulfate therefrom.
5. The composition of claim 4 in which said copper salt is cupric nitrate.
6. The composition of claim 4 in which said copper salt is employed in amount such that upon thermal decomposition of said salt about 10% CuO is present in said catalyst.

References Cited by the Examiner
UNITED STATES PATENTS

| | | | |
|---|---|---|---|
| 2,020,411 | 11/1935 | Greer | 252—476 |
| 2,330,115 | 9/1943 | Drennan | 252—437 |
| 2,772,244 | 11/1956 | Shalit et al. | 252—437 |
| 2,967,156 | 1/1961 | Talvenheimo | 252—437 |
| 3,025,132 | 3/1962 | Innes | 23—2 |
| 3,025,133 | 3/1962 | Robinson et al. | 23—2 |

MAURICE A. BRINDISI, *Primary Examiner.*

UNITED STATES PATENT OFFICE
CERTIFICATE OF CORRECTION

Patent No. 3,231,516 January 25, 1966

Wright W. Gary

It is hereby certified that error appears in the above numbered patent requiring correction and that the said Letters Patent should read as corrected below.

Column 5, line 33, for "20" read -- 30 --.

Signed and sealed this 6th day of December 1966.

(SEAL)
Attest:

ERNEST W. SWIDER
Attesting Officer

EDWARD J. BRENNER
Commissioner of Patents